(No Model.)

L. M. NEWELL.
FLORAL ARCH FLOWER STAND.

No. 596,664. Patented Jan. 4, 1898.

Witnesses.

Inventor.
Hoylson M. Newell

UNITED STATES PATENT OFFICE.

LOYLSON MYRON NEWELL, OF NEWTON, KANSAS.

FLORAL-ARCH FLOWER-STAND.

SPECIFICATION forming part of Letters Patent No. 596,664, dated January 4, 1898.

Application filed May 22, 1897. Serial No. 637,813. (No model.)

*To all whom it may concern:*

Be it known that I, LOYLSON MYRON NEW-ELL, a citizen of the United States, residing in the city of Newton, county of Harvey, State of Kansas, have invented a Self-Supporting Adjustable Floral-Arch Flower-Stand, of which the following is a specification.

My invention relates to an economical and ornamental arrangement of brackets for house plants.

The objects of my invention are, first, to support columns of house plants at the sides of the window; second, to save marring the window-casings by placing brackets or shelves upon them; third, to leave the window-shade free for adjustment; fourth, to connect the brackets of a column so that with one motion they may be turned to or from the window in adjusting shade; fifth, to reserve the center of the window free from obstruction; sixth, to form an arch which will brace the top of the columns and accommodate hanging basket; seventh, to make said "floral arch" self-supporting by a strong foundation; eighth, to occupy but little floor-space; ninth, to make foundation highly ornamental by a support for central figure with surrounding decorations at the lower part of the window; tenth, to make a fine decoration for the room, while it makes the window attractive from without; eleventh, to make the whole adjustable, so it may be taken down and set up at pleasure. I attain these objects by a high arch firmly anchored in a strong foundation, which occupies but little floor-space and is made highly ornamental by a central pedestal. Thus with a limited or narrow space of floor-room from twenty-five to fifty (25 to 50) pots of plants may be accommodated, as one may desire, and the marring of window-casings with brackets or shelves is avoided.

This floral arch is both self-supporting and adjustable, the columns of brackets being turned toward or from the window by a connecting-rod, leaving the shades free for adjustment, and the whole may be taken down and set up at pleasure. At the top of the arch a hanging basket may be suspended, while the center of the window is left free. This arch is highly ornamental, with the inside columns of plants for common window, while for broad or bay windows its width may be increased and its columns of plants multiplied. This arch so distributes the plants that the most satisfactory arrangement in the sunlight is secured for them all at the same time. With heaviest pots on the base, a fine centerpiece on the pedestal, a hanging basket in the arch, and plants tastily arranged, leaving center of window free, it makes a most artistic decoration for the room and window.

Figure 1:
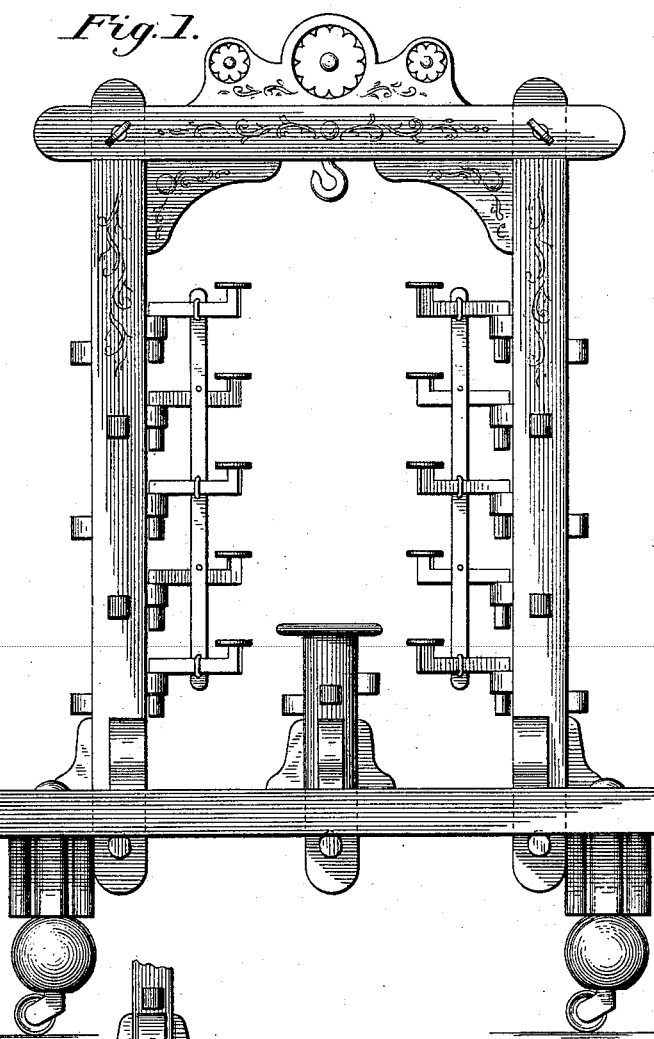
Figure 2:
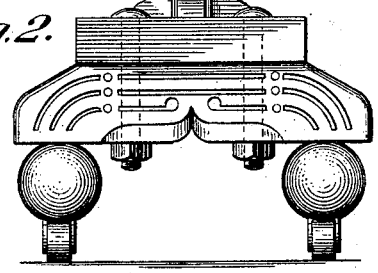
Figure 3:
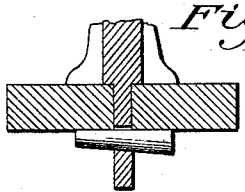

In the drawings forming a part of this specification, Figure 1 is a front view of my flower-stand. Fig. 2 is an end view of its base. Fig. 3 is a detail sectional view showing manner of anchoring the arch and pedestal in the supporting-foundation, as hereinafter shown and described.

This invention has a strong foundation consisting of a plank platform from one to two (1 to 2) feet wide, or more should it be desired, resting upon sills from two to four (2 to 4) inches thick and attached thereto by movable iron bolts, as shown in Fig. 2 of drawings. To give the height of platform desired, the sills are elevated upon wooden balls, which are attached by means of tenons on the balls entering sills, as indicated by dotted lines on sills in Fig. 1 of drawings. In the center of the platform is a mortise for pedestal, and at each end of the platform, just inside of the sills, are mortises to receive the columns of the arch. These columns and pedestal are joined to platform by tenons, through which a hole is bored, so that when placed in mortise a strong draw-pin holds them firmly in position, as shown in Fig. 3 of drawings. Foot-braces are also employed to increase strength. The pedestal has four foot-braces, one on each side. The pedestal has a top to receive either an aquarium, jardinière with plant, or some choice centerpiece. In the full size corner-brackets are placed underneath the top to add support. Upon the sides of the pedestal are placed brackets to support plants around the central figure, as shown in Fig. 1.

The sides of the arch have each three foot-braces to add strength, as indicated by Figs. 1 and 2. The width of the arch and length of platform may be varied to suit either narrow or wide windows. While the platform is designed to receive heavier pots, the wooden side columns of the arch are sufficiently strong and are intended for as many rows and as many brackets in a row as may be desired.

The top of the arch is joined by mortises and tenons with wooden keys, as shown in Fig. 1. At the top of the arch is a place for hanging basket. A connecting-rod is employed to join brackets in a row, either by hooks setting over the brackets or the rod lashed to the brackets dividing their centers, so one pot is not directly over the plant below, as shown in Fig. 1. In the use of this connecting-rod with one motion a whole column is turned to the light or from the window, thus leaving the shade free for adjustment.

What I claim, and desire to secure by Letters Patent, is—

1. In a flower-stand the combination with a supporting-foundation, the platform of said foundation having mortises and attached to sills, of a high arch, the standards of said arch any desired height, having foot-braces, and adapted to receive columns of brackets, substantially as shown and described.

2. In a flower-stand the combination with the supporting-foundation, the platform of said foundation having mortises and attached to sills by movable bolts, of a high arch, movable draw-pins and tenons securing arch in the supporting-foundation and rendering said arch detachable, substantially as shown and described.

3. In a flower-stand the combination with the supporting-foundation having sills and elevating foundation-balls with tenons in sills, of a high arch adapted to receive columns of brackets, a connecting-rod uniting the brackets of a column in a row and dividing their centers, substantially as shown and described.

4. In a flower-stand the combination with the supporting-foundation of a high arch having cross-piece with corner-brackets and a crowning centerpiece, mortises and tenons with movable keys attaching cross-piece to supporting-standards, substantially as shown and described.

5. In a flower-stand the combination with the supporting-foundation, of a high arch, a central pedestal having foot-braces and adapted to receive centerpiece at top and brackets at sides, substantially as shown and described.

6. In a flower-stand the combination with the supporting-foundation of a central pedestal, draw-pin and tenon securing through mortise of platform and making said pedestal detachable, substantially as shown and described.

LOYLSON MYRON NEWELL.

In presence of—
 JESSE W. SHACKLETT,
 CLARENCE SPOONER.